United States Patent
Veiga (10) Patent No.: US 6,630,220 B1
(45) Date of Patent: Oct. 7, 2003

(54) SEWN FUSION SEAL PROCESS FOR PRODUCING AIR-HOLDING VEHICLE RESTRAINT SYSTEMS

(75) Inventor: Manuel J. Veiga, Tewksbury, MA (US)

(73) Assignee: Bradford Industries, Inc., Lowell, MA (US)

( * ) Notice: Subject to any disclaimer, the term of this patent is extended or adjusted under 35 U.S.C. 154(b) by 0 days.

(21) Appl. No.: 09/572,176

(22) Filed: May 17, 2000

Related U.S. Application Data (60) Provisional application No. 60/178,897, filed on Jan. 28, 2000.

(51) Int. Cl.[7] .................................. B32B 3/06; B60R 21/16
(52) U.S. Cl. ........................ 428/102; 428/12; 428/577; 428/33; 428/34.1; 428/34.3; 428/34.5; 428/34.6; 428/34.7; 428/35.2; 428/35.7; 428/35.9; 428/36.1; 428/59; 428/61; 428/66.4; 428/66.6; 428/66.7; 428/68; 428/69; 428/121; 428/130; 428/131; 442/64; 442/65; 442/66; 442/164; 442/168; 280/728.1; 280/743
(58) Field of Search ........................... 428/12, 577, 33, 428/34.1, 34.3, 34.5, 34.6, 34.7, 35.2, 35.7, 35.9, 36.1, 59, 61, 66.4, 66.6, 66.7, 68, 69, 102, 121, 130, 131; 442/64, 65, 66, 164, 168; 280/728.1, 743

(56) References Cited

U.S. PATENT DOCUMENTS

| | | |
|---|---|---|
| 4,284,682 A | 8/1981 | Tschirch et al. |
| 5,110,666 A | 5/1992 | Menzel et al. |
| 5,178,938 A | 1/1993 | Magistro et al. |
| 5,226,671 A | 7/1993 | Hill |
| 5,240,765 A | 8/1993 | Takahashi et al. |
| 5,254,621 A | 10/1993 | Inoue et al. |
| 5,258,211 A | 11/1993 | Momii et al. |
| 5,298,317 A | 3/1994 | Takahashi et al. |
| 5,399,402 A | 3/1995 | Inoue et al. |
| 5,514,431 A | 5/1996 | Shimomura |
| 5,630,620 A | 5/1997 | Hirai et al. |
| 5,632,057 A | 5/1997 | Lyden |
| 5,647,079 A | 7/1997 | Hakamiun et al. |
| 5,651,395 A | 7/1997 | Graham et al. |
| 5,704,402 A | 1/1998 | Bowen et al. |
| 5,707,711 A | 1/1998 | Kitamura |
| 5,721,046 A | 2/1998 | Shrewsburg et al. |
| 5,863,644 A | 1/1999 | Bonigk et al. |
| 5,881,776 A | 3/1999 | Beasley, Jr. |
| 5,921,287 A | 7/1999 | Bowen et al. |
| 6,037,279 A | 3/2000 | Brookman et al. |

Primary Examiner—Cheryl A. Juska
Assistant Examiner—Arti R. Singh
(74) Attorney, Agent, or Firm—Hollander Law Firm, P.L.C.

(57) ABSTRACT

A method is disclosed for producing an air-holding vehicle restraint system, wherein a textile fabric is coated on at least one side with a thermoplastic polymeric material and folded along its lengthwise direction to form a closed bottom end and two open upper ends, with the coated side of the fabric facing inwardly. The method also comprises folding a portion of each of the upper open ends of the textile fabric so that they turn outwardly to form a coated platform, and laying a sealing tape upon the coated platform. The sealing tape is then secured to the coated platform and sealed to the coated platform. The method further comprises cutting the coated textile fabric along predetermined side edges to form an air-holding vehicle restraint system of desired shape, and sealing the cut side edges of the coated textile fabric. In an alternative embodiment; an intermediate electroconductive layer is positioned between the coated platform and the sealing tape to provide electroconductive assistance for heat sealing by microwaves in a microwave oven. An air-holding vehicle restraint system is also disclosed which is produced by the method of the invention.

36 Claims, 9 Drawing Sheets

SEWN FUSION SEAL PROCESS FOR PRODUCING AIR-HOLDING VEHICLE RESTRAINT SYSTEMS

CROSS REFERENCE TO RELATED APPLICATIONS

This application claims priority to provisional application No. 60/178,897, filed Jan. 28, 2000.

BACKGROUND OF THE INVENTION

1. Field of the Invention

This invention relates to inflatable automotive vehicle safety restraint devices such as air bags, side air curtains or the like. More particularly, the invention relates to a process that combines sewing and thermoplastic fusion of knitted, woven and non-woven coated textile fabric in the manufacture of these safety devices. When the coated textile fabric is sewn and heat sealed in the process, a portion of the coating material flows into the stitch holes and seals them, thus providing a strong, airtight air bag structure. The process also provides a means for an improved, more efficient and semi-continuous manufacturing process for stitching and sealing the air bags and side air curtains.

2. Description of the Related Art

Present safety restraint devices for automotive vehicles include driver and passenger side air bags that are rapidly inflated by a gas—sometimes referred to herein as "air"—which is produced by explosion of a pyrotechnic material at the time of a collision. The devices provide a protective barrier between the vehicle occupants and the vehicle structure. Much of the impact of a collision is absorbed by the air bag, thus preventing or, in many cases, lessening the possibility of serious bodily injury to the vehicle occupants. Air bags are typically stored in a collapsed, folded condition in the steering wheel to protect the driver, and in the dashboard to protect a front seat passenger., The automotive industry has recently introduced side air bags that are stored in the back of the front seats or in the rear seats to protect the cabin occupants in the event of a collision occurring on either side of the vehicle. More recently still, a further safety feature that has been made available for passenger vehicles, especially the so-called sport utility vehicles (SUVs), and minivans, is the side-impact protective inflatable side air curtain that is designed to provide a cushioning effect in the event of side collisions or rollover accidents. These side air curtains are stored uninflated along the roof of the vehicle or in one of the main support pillars of the vehicle. In the event of a collision the side air curtain deploys along the interior side walls of the vehicle cabin, protecting the occupants from serious bodily injury from contact with the vehicle structure and from broken glass.

Each of these various types of air bags has different design and physical property requirements, such as gas (air) holding permeability, air pressure and volume, and puncture resistance. For example, driver and front passenger air bags, which inflate and deflate almost immediately thereafter, must have little or no permeability; passenger side air bags require a controlled permeability. Side air curtains, on the other hand, must retain air pressure for relatively longer periods of time than other types of air bags. Moreover, all vehicle air restraint devices must have superior packageability and anti-blocking properties. Packageability refers to the ability of a relatively large device such as an air bag to be packed in a relatively small space, such as within a steering wheel or within a vehicle support pillar. Anti-blocking properties refers to the ability of the device to deploy instantaneously when needed without any resistance caused by the material sticking to itself, particularly after being stored for relatively long periods of time. These and other physical properties are determined in large part by the type of fabric and weave used in the air bag, whether the fabric is knitted, woven or non-woven, and, importantly, the nature of the coatings that are used on the fabric.

The air holding capability of side air curtains is critical since they must remain inflated for extended periods of time to protect passengers in multiple rollover accidents. Unlike air bags, which are designed to inflate instantaneously and to deflate almost immediately after inflation to avoid injury to the driver and front seat passenger, side air curtains used in SUVs, or in ordinary passenger vehicles must be capable of remaining inflated from about 3 to about 12 seconds depending upon the size of the air curtain and the size and type of vehicle involved. An average passenger vehicle would require a side air curtain of from about 60 inches to about 120 inches in length measured along the side of the vehicle. A larger vehicle, such as a minivan, would require an even longer side air curtain. The inflation period of a side air curtain should be sufficient to protect the cabin occupants during at least three rollovers, the maximum usually experienced in such. incidents.

When side air curtains are deployed they may be subjected to extreme pressures within a relatively broad range depending upon their specific location or application. For example, air bag deployment pressures are generally in the range of from about 50 kilopascals (kpa) to about 450 kpa, which corresponds generally to a range of from about 7.4 psi (pounds per square inch) to about 66.2 psi. Since sewing or stitching is used in the manufacture of the air bag structure, air can easily escape at these pressures through the stitch holes unless the stitches are sealed or fused by RF welding or other types of sealing.

Accordingly, there is a need for fabric products and methods of construction for air bags that will be relatively impermeable to fluids under such anticipated pressures while also being relatively light in weight.

One means of improving air holding capability in vehicle restraint devices has been through coatings such as chloroprene and silicone rubber coatings applied to a textile (e.g., nylon) fabric. U.S. Pat. No. 5,110,666 discloses a woven nylon fabric coated with polyurethane to provide the desired permeability and retention of inflation gas. Nevertheless, wherever coated fabrics are used the problems of controlling air permeability, air pressure, and volume remain. Insufficiency of adhesion of the coating material to the textile fabric substrate also is a serious problem that must be addressed. For example, the smoother the textile fabric surface generally the more difficult it is to obtain strong adhesion of the coating material to the fabric. With some coatings such as silicone rubber (polysiloxane), radio frequency (RF) heat sealing techniques cannot be used to form the air bag because this material will not flow at heat sealing temperatures. In such instances, air bags are usually made by stitching, a process that requires the addition of an adhesive sealant in the stitched areas. Even so, leakage of air occurs at the stitching, which lessens the protective capability of the air bag.

U.S. Pat. No. 5,863,644 discloses woven or laid structures using hybrid yams comprising reinforcing filaments comprised of thermoplastic polymers to form textile sheet materials of adjustable gas and/or liquid permeability. During the formation of textile fabrics in accordance with the disclosure, polyester fibers in the weaves are melted by the application of heat to form textile sheet materials that are stated to have predetermined gas and/or liquid permeability.

Improved polyurethane, acrylic, polyamide, and silicone coatings that are coated in layers on the fabrics have recently been developed. It has been found that adhesion and heat sealing characteristics are greatly improved with such layered coatings. Examples of such coated fabrics and methods of coating such fabrics are disclosed in copending commonly assigned applications Ser. Nos. 09/327,243, filed Jun. 7, 1999, now U.S. Pat. No. 6,239,046 B1, 09/327,244, filed Jun. 7, 1999, abandoned in favor of 09/956,639, filed Sep. 19, 2001, and 09/327,245 filed Jun. 7, 1999, abandoned in favor of 09/956,640, filed Sep. 19, 2001, the disclosures of which are incorporated herein by reference and made a part of this disclosure. Another example of a greatly improved bonding system is a polyurethane epoxy resin and polysiloxane beaded heat seal, that is disclosed in copending commonly assigned application Ser. No. 09/452,030, filed Nov. 30, 1999, now U.S. Pat. No. 6,350,709 B1, which is incorporated herein by reference and made a part of this disclosure. A further development in air bag technology is disclosed in another commonly assigned copending application Ser. No. 09/459,768, filed Dec. 13, 1999, now abandoned, in which the inflatable safety device incorporates connective tubular tethers within the restraint device to provide structural support and stiffening when it is inflated. This application is also incorporated herein by reference and made a part of this disclosure. My copending provisional application Ser. No. 60/178,897, filed Jan. 28, 2000 relates to a Sewn Fusion Seal Process for producing air-holding vehicle restraint systems as disclosed herein. The disclosure of my provisional application Ser. No. 60/178,897 is also incorporated herein by reference.

Despite the advances made in air bag coating technology, problems inherent in controlling air permeability, pressure and volume remain. One such problem involves air loss resulting from the fact that during the manufacture of the air bags coated textiles are stitched together by sewing. Each stitch creates a potential leak that adversely affects the integrity and air-holding capability of the bag. At present, stitched or sewn areas of air bag construction are sprayed with an acrylic, polyurethane, polyurethane acrylic, polymeric, or other type of synthetic resin to be made airtight. The present invention addresses this problem and presents a method for stitching and thermoplastically fusing the stitched seam that results in a strong, sealed air bag structure that has superior air-holding ability and that can be adapted, if desired, for incorporation in a semi-continuous process for the manufacture of air bags.

SUMMARY OF THE INVENTION

It has been found that by using a combination of sewing and thermoplastic fusion in the manufacture of air bags (collectively including air bags, side air bags and side air curtains), the leakage of air through stitch holes is eliminated or so substantially reduced as to be negligible in effect. This process results in an inflatable air-holding automotive vehicle restraint system that is able to withstand the explosive pressures of inflation and is adaptable for use in a semi-continuous manufacturing process.

A method is disclosed for producing an air-holding vehicle restraint system, comprising coating a textile fabric on at least one side with a thermoplastic polymeric material, folding the coated textile fabric along its lengthwise direction to form a closed bottom end and two open upper ends, with the coated side of the fabric facing inwardly, and folding a portion of each of the upper open ends of the textile fabric so that they turn outwardly to form a coated platform. The method further comprises laying a sealing tape upon said coated platform, securing one sealing tape to the coated platform, sealing the sealing tape to said coated platform, cutting the coated textile fabric along predetermined side edges to form an air-holding vehicle restraint system of desired shape, and sealing the cut side edges of the coated textile fabric. Preferably, the sealing tape is secured to the coated platform by sewing. The step of sealing the sealing tape to the coated platform preferably is accomplished by heat. Further, the side edges of the textile fabric are sealed by sewing and heat sealing. The method further comprises the step of folding the upper open ends of the taped, sealed platform upwardly and securing them together form a tube-shaped structure at the upper end of the air-holding vehicle restraint system. The step of securing the upper ends together is accomplished preferably by sewing. Other securing means are contemplated. Alternatively, the method may include the step of coating the second side of the textile fabric.

The textile fabric is preferably comprised of synthetic fibers which are selected from the group consisting of polyamides and polyesters. Preferably the textile fabric is a knitted, woven, or non-woven fabric, and is preferably woven nylon.

Preferably, the coating of thermoplastic polymeric material on the at least one side of the textile fabric comprises a first adhesive coating layer selected from the group consisting of aromatic or aliphatic polyester or polyether polyurethanes and a second elastomeric coating layer which comprises an elastomeric polyether or polyester polyurethane. The sealing tape comprises a textile fabric coated on at least one side with a thermoplastic polymeric material and the polymeric material coating on the sealing tape is preferably polyurethane The first mentioned textile fabric is comprised of synthetic fibers and the textile fabric is a knitted, woven, or non-woven fabric. The textile fabric of the sealing tape is comprised of synthetic fibers and is knitted, woven, or non-woven, and the synthetic fibers thereof are selected from the group consisting of polyamides and polyesters. The textile fabric of the sealing tape is woven nylon.

According to the method the sealing tape is laid upon the coated platform with its thermoplastic polyurethane coating in face-to-face contacting relationship with said polyurethane coated platform. The adhesive coating layer has a coating weight of from about 0.3 ounces/sq. yd. to about 1.5 ounces/sq. yd. and the second coating layer has a solids content of from about 30% to about 100% by weight. The second coating layer has a coating weight of from about 1 ounce/sq.yd. to about 8 ounces/sq.yd. The coating of thermoplastic polymeric material comprises a first adhesive layer selected from the group consisting of aromatic or aliphatic polyester or polyether polyurethanes and a second elastomeric coating layer consisting of an elastomeric polyether or polyester polyurethane.

According to an alternative embodiment, an additional intermediate layer is positioned between the coated platform and the coated sealing tape. The intermediate layer comprises an electroconductive strip of unsupported film. The unsupported electroconductive film strip is sewn between said coated platform and the coated sealing tape and has electroconductive material therein. The electroconductive material is selected from the group consisting of powdered metal, carbon black, stainless steel and aluminum, and is in the form of particles interspersed therethrough. The unsupported electroconductive strip is preferably a polyurethane film. The heat sealing step is effected by radio frequency sealing, preferably from about 10 to about 80 megahertz. Hot air sealing or ultrasonic sealing are also contemplated.

An air-holding vehicle restraint system is disclosed which comprises a textile fabric having a thermoplastic polymeric coating on at least one side thereof, the coated fabric being folded along its lengthwise direction to form a closed bottom end and two open upper ends, with the coated side of the fabric facing inwardly, each of the upper open ends of the textile fabric being turned outwardly to form a coated platform. A sealing tape is positioned upon the coated platform and in contact therewith, and means is provided to secure the sealing tape to the coated platform. The sealing tape is sealed to the coated platform and said coated textile fabric is cut along predetermined side edges. Means is provided to seal the cut side edges of the coated textile fabric to form an air-holding vehicle restraint system of desired shape. Alternatively, the second side of the textile fabric may be coated with a polymeric material.

According to an alternative embodiment, an intermediate layer is positioned between the coated platform and the coated sealing tape. The intermediate layer comprises a conductive unsupported film strip, preferably polyurethane, having interspersed therethrough, conductive material such as powdered metal, carbon black, stainless steel, aluminum or the like. The conductive strip facilitates heat sealing in a microwave oven by generating heat through the microwave action.

BRIEF DESCRIPTION OF THE DRAWINGS

Preferred embodiments of the invention are described hereinbelow with reference to the drawings, wherein:

FIG. 7 is a perspective view of the roll of taped and stitched, heat sealed textile fabric of FIG. 5 being unwound in preparation for forming into an automotive vehicle restraint system, such as a side air curtain, side air bag or the like;

FIG. 8 is a right side frontal perspective view from above, of the end of the taped and stitched, heat sealed textile fabric of FIG. 7;

DETAILED DESCRIPTION OF THE INVENTION

The present invention relates to a method for the manufacture of an inflatable air-holding vehicle safety device, such as an air bag, side air bag or side air curtain by means of a combination of stitching (sewing) and heat sealing (fusion). In the inventive method, separate pieces or parts of textile fabric coated with a thermoplastic polyurethane coating and a thermoplastic polyurethane coated sealing tape are stitched together and heat sealed by melting or flowing (fusion) of the coating material into the stitch holes, thereby sealing the holes and making them airtight. The inventive method is particularly suitable for incorporation into a semi-continuous process for manufacturing the basic air bag structure (not including the inflator and related inflation equipment), thereby making it particularly effective and cost efficient. An air-holding safety device, such as a side air curtain, is produced by joining the ends of textile fabric that has been coated on at least one side with an elastomeric polyurethane coating. Preferably, the coating comprises two or more layers, at least one of which is an adhesive or prime coat layer of polyurethane, and a second layer of elastomeric polyurethane. In addition, a third layer or top coat of elastomeric polyurethane can be added to form a non-stick surface, where necessary or desirable. Alternatively, both sides may be coated.

In forming the coated fabrics of the invention, a base textile fabric, such as woven nylon, is coated on a first side with a prime coat of an adhesive polyurethane layer to enhance adhesion of subsequent layers and to control the penetration of a second coating layer into the textile. The adhesive coat also serves to adhesively bond the filaments of the textile substrate so they do not comb or unravel. The polyurethane used in the prime or adhesive layer can be selected from among the aromatic or aliphatic polyether or polyester polyurethanes and, preferably, from among those having a solids content of from about 20% to about 75% by weight. These types of polymeric polyurethanes provide good adhesion to textile fabric, particularly in the case of nylon. They also provide satisfactory hydrolysis, i.e. resistance to breakdown under ambient storage conditions, to insure that the air bag or side air curtain will be ready for use when deployed. The prime or adhesive coat is comprised of from about 20% to about 50% by weight of polyurethane, with the remainder of the formulation being solvent, biocide, and ultraviolet stabilizer.

In forming the coated textile fabric, a second coating layer of elastomeric polyurethane is coated onto the first or adhesive coating layer to form a two-layered coating on the textile fabric. The elastomeric layer is comprised of from about 30% to about 100% solids by weight of an aromatic or aliphatic polyether or polyester polyurethane. Optionally, depending on the chemical and physical properties sought to be introduced into the airbag, there is added to the elastomer composition such additional materials as, for example, flameproofing agents, such as aluminum trihydrate or antimony trioxide, mildew prevention agents, such as BP5® by Morton Thiokol, and UV and ozone resistance agents, e.g., Tinuvin 765® by Ciba Geigy. As noted, a third or top coat layer of elastomeric polyurethane can be added where a non-stick surface is required. The second or opposed side of the coated textile fabric may or may not be coated, depending upon the particular application for which the air bag is intended. In particular, the second or opposed side of the air curtain may be coated with polysiloxane or polyurethane, as required or desirable. In this embodiment, the coating on the second surface may be polysiloxane alone. Alternatively, the second or opposed side of the textile fabric may be coated with one or more layers of polyurethane, a first layer being adhesive polyurethane and the second layer being elastomeric polyurethane. Examples of the coatings that may be applied to the second or opposed side of the fabric are set forth in the aforementioned applications Ser. Nos. 09/327, 243, filed Jun. 7, 1999, now U.S. Pat. No. 6,239,046 B1, 09/327,244, filed Jun. 7, 1999, abandoned in favor of 09/956,639, filed Sep. 19, 2001, and 09/327,245, filed Jun. 7, 1999, abandoned in favor of 09/956,640, filed Sep. 19, 2001. When the second or opposed side is coated, such coatings assist in providing additional anti-blocking properties, sealing and flame retardant properties.

Either natural or synthetic knit, woven or non-woven fabric can be employed as the base textile fabric herein, with synthetic fabrics of polyamide or polyester fibers being preferred. Woven nylon as the base textile fabric is particularly preferred. Any denier size, fiber shape or weaving configuration can be employed to advantage in the invention. The shape or configuration of the air-holding restraint device will depend upon its ultimate location in the vehicle. Driver or passenger side air bags will generally be elliptical, spherical or circular in shape, while side air curtains will generally be rectangular or oval in configuration.

Figure 1:
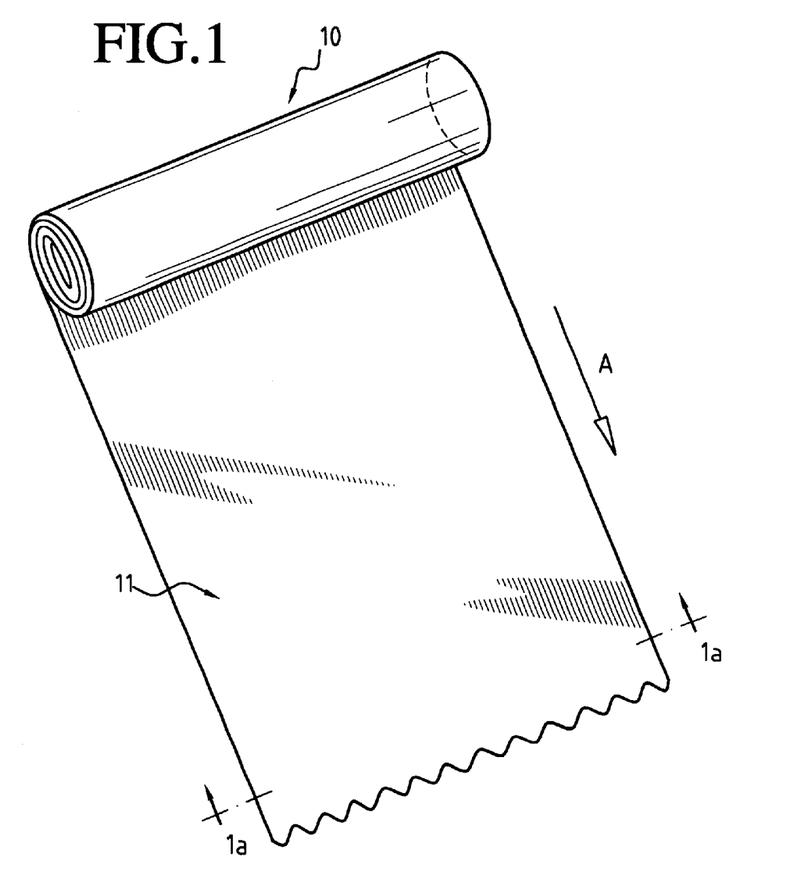
FIG. 1 is a left side perspective view from above of a roll of coated textile fabric for use in producing air-holding vehicle restraint systems in accordance with the present invention.
Figure 1A:
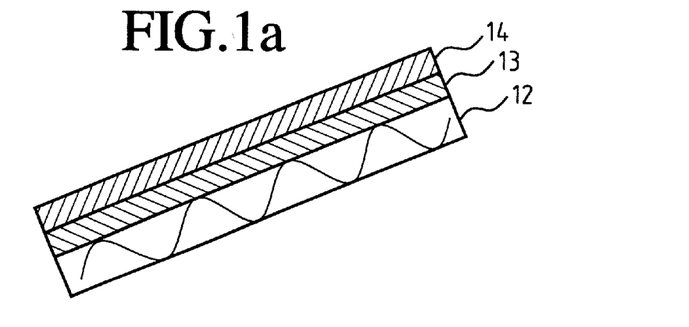
FIG. 1a is a cross-sectional view taken along lines 1a—1a of FIG. 1.

In the process of the invention, as shown in FIG. 1, a roll of previously wound textile fabric 10, coated on at least a first side with a coating of thermoplastic polyurethane as described above, is unwound and pulled in direction "A" with the polyurethane coated side 11 facing upwardly. The coated textile fabric should be oriented so that the polyurethane coated side 11 will form the interior sides of the air bag when folded since this interior polyurethane coating will be the means by which it is sealed in the inventive process. The polyurethane coating layers are applied to the fabric as shown in FIG. 1a, which is a cross-sectional view of the coated textile fabric of FIG. 1, taken along lines 1a—1a. As illustrated in FIG. 1a, the textile fabric 12, which, for example, may be woven nylon, is coated with a prime or adhesive polyurethane layer 13. A second layer of elastomeric polyurethane 14 is coated onto the adhesive layer of polyurethane 13. Alternative polyurethane coating layers as described in the copending commonly assigned application Ser. No. 09/327,244, abandoned in favor of 09/956,639, filed Sep. 19, 2001, may be used as desired. As noted, optionally the second side may be coated with a polymeric material such as polyurethane or polysiloxane.

Figure 2:
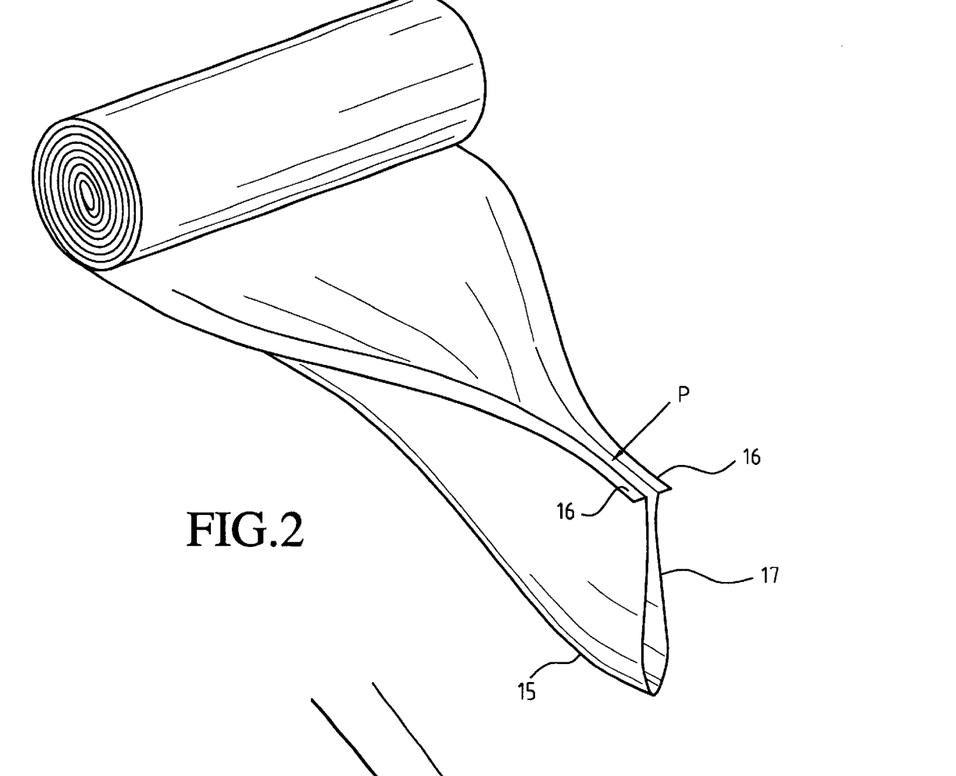
FIG. 2 is a left side perspective view from above of the roll of coated textile fabric of FIG. 1, illustrating the initial steps of folding the textile material to form a coated platform for producing an automotive vehicle restraint system.
Figure 3:
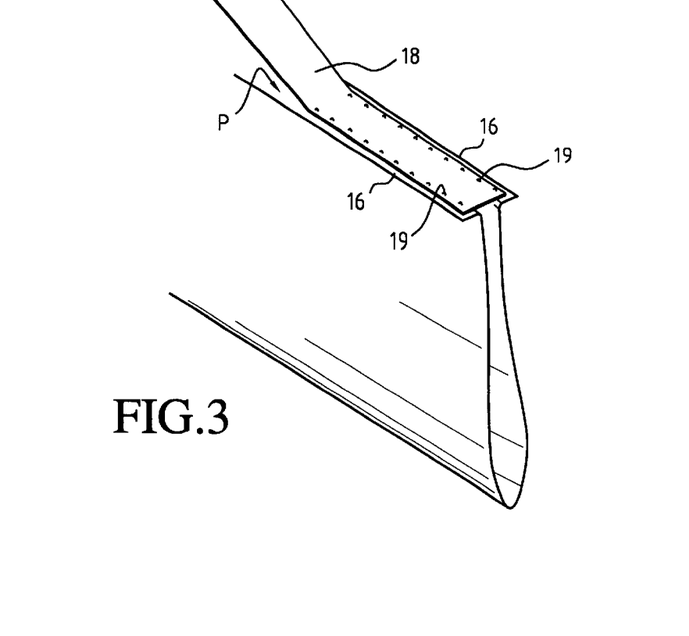
FIG. 3 is a left side perspective view from above of the folded, coated textile fabric of FIG. 2, illustrating the step of overlaying and stitching a coated sealing tape thereto.
Figures 3A, 3B:
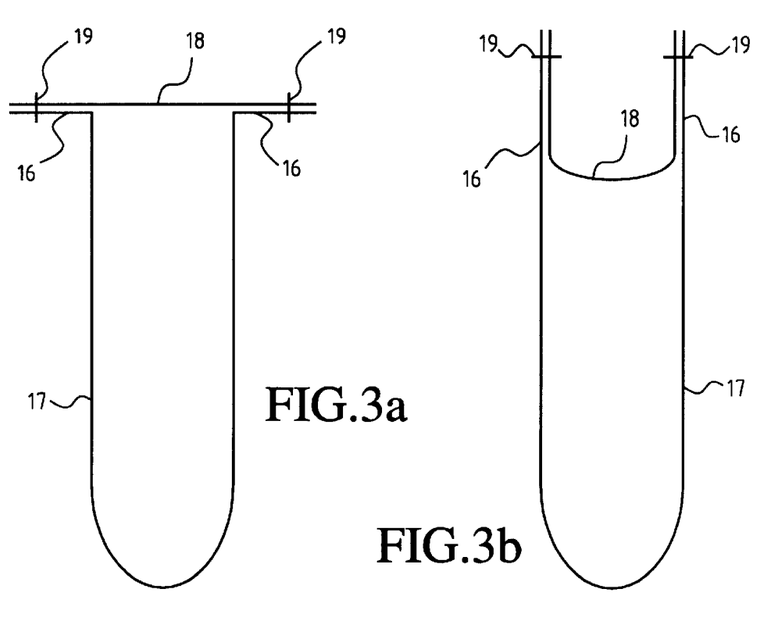
FIG. 3a is a front view of the folded, coated textile fabric of FIG. 3, with coated sealing tape stitched thereto.
FIG. 3b is a front view of the taped, coated textile fabric of FIG. 3a, with stitched end portions folded upwardly.
Figure 3C:
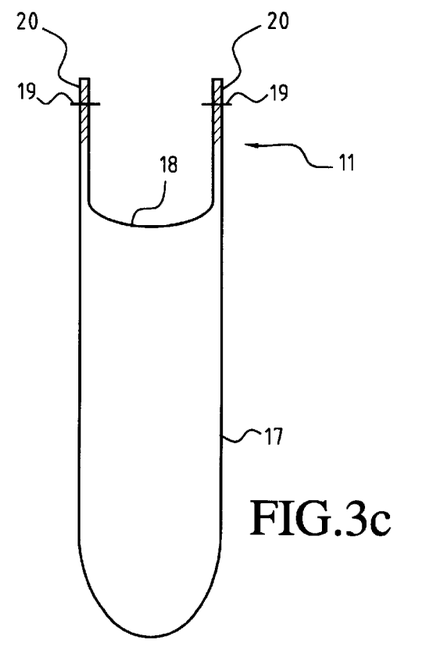
FIG. 3c is a front view of the taped, coated textile fabric of FIG. 3b, after it is subjected to the step of heat sealing.
Figure 3D:
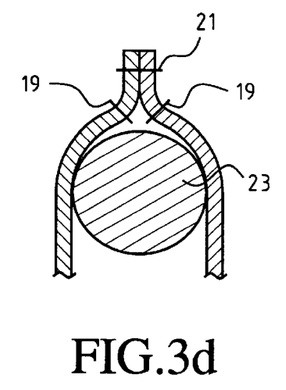
FIG. 3d is a frontal cross-sectional view of an embodiment of the invention wherein the outwardly extending wings forming the platform P are folded upwardly and secured by stitching to form a channel for supporting the system on a rod in the vehicle.

The coated textile fabric of FIG. 1 is folded lengthwise as shown in FIG. 2, with the closed fold 15 at the bottom and the two sides 17 open at the top. A portion of each of the top ends of the two sides 17 is folded outwardly so as to form two wings 16, which form a T-shaped polyurethane coated platform P, with the sides 17 of the coated textile fabric. Sealing tape 18, which is a polyurethane coated textile fabric, preferably woven nylon, that is coated in a manner similar to that of coated textile fabric 11, is overlaid on top of the coated platform P as shown in FIG. 3. In overlaying the polyurethane coated sealing tape 18 into position onto coated platform P, the polyurethane coated side of sealing tape 18 is placed in face-to-face relationship with the polyurethane coated upwardly facing side of wings 16 that form platform P. The polyurethane coated sealing tape 18 is then stitched to each of wings 16 by rows of stitching 19. A front view of the folded textile fabric with the sealing tape 18 attached to the wings 16 of the T-shaped platform P by stitching 19 is shown in FIG. 3a. The stitched wings 16 with coated sealing tape attached are then unfolded and positioned upwardly so that they are aligned with the sides 17 of the folded textile fabric as shown in FIG. 3b. Optionally, the upwardly positioned wings 16 may be secured together as shown in FIG. 3d by stitches 21 to form a tubular section to facilitate supporting the completed air restraint system in a vehicle by a rigid suspension rod 23 or the like.

Figure 4:
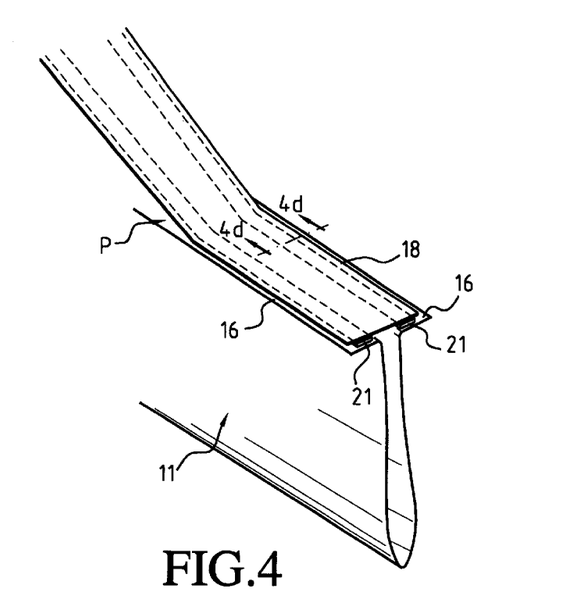
FIG. 4 is a left side perspective view from above of an alternative embodiment similar to the folded and taped, coated textile fabric of FIG. 3, but also incorporating intermediate electroconductive sealing strips.
Figure 4A:
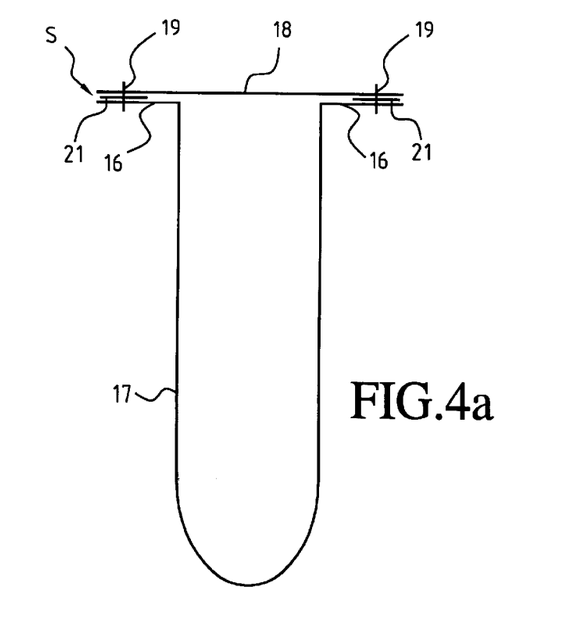
FIG. 4a is a front view of the taped, coated textile fabric of FIG. 4, with intermediate sealing strips positioned in place and stitched thereto.
Figure 4B:
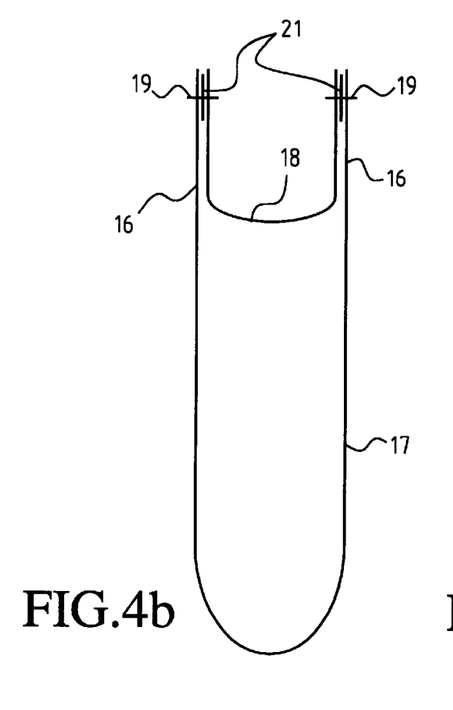
FIG. 4b is a front view of the taped, coated textile fabric of FIG. 4a, with end portions folded upwardly similar to the embodiment shown in FIG. 3b.
Figure 4C:
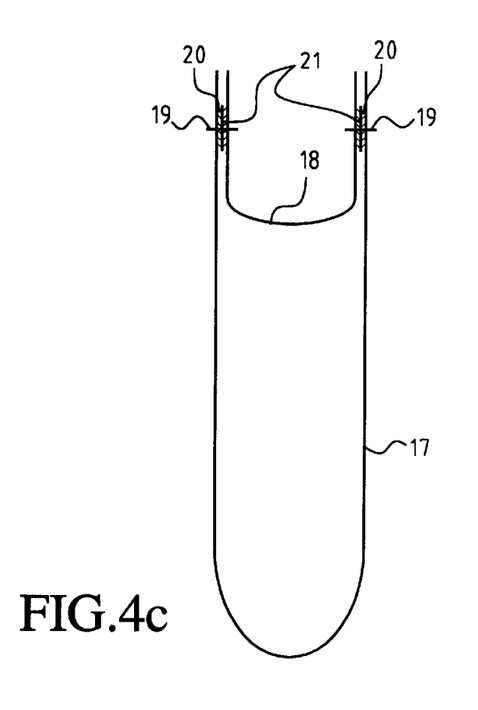
FIG. 4c is front view of the taped, coated textile fabric of FIG. 4b, after it is subjected to the step of heat sealing.
Figure 4D:
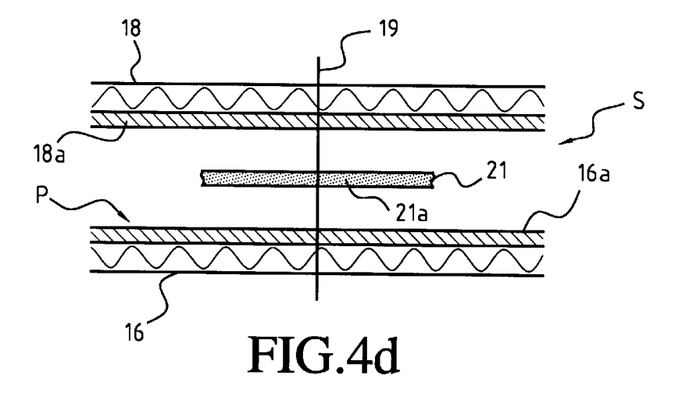
FIG. 4d is a cross-sectional view taken along lines 4d—4d of FIG. 4, with components separated for illustrative purposes, and showing details of the component structures of the coated textile fabric, the intermediate electroconductive sealing strips, and the overlying coated sealing tape.

In an alternative method for the manufacture of air bags or side air curtains, as shown in FIG. 4, intermediate electroconductive film strips 21 are positioned (dashed lines) between the wings 16 of platform P and coated sealing tape 18 to form a sandwich shown in FIG. 4a and denoted as FIG. 4d. FIG. 4d shows a cross-sectional view taken along lines 4d—4d, greatly enlarged, in which one wing 16 of platform P has an intermediate electroconductive film strip 21 sandwiched (S) between wing 16 and coated sealing tape 18. Polyurethane coating 16a on the folded wing 16, and polyurethane coating 18a on the sealing tape 18 are placed in face-to-face relationship with the intermediate electroconductive film strip 21. Stitches 19 fasten the layers of the sandwich S together.

The electroconductive film strips 21 are comprised of unsupported polyurethane film throughout which is interspersed with powdered aluminum, stainless steel or other powdered electroconductive metal, or carbon black shown schematically at 21a. The intermediate electroconductive polyurethane film strips 21 are preferably from about 0.005 to about 0.020 inches in thickness, although other thicknesses may be employed as required for a particular operation. Coated sealing tape 18 and electroconductive film strips 21 are then stitched into platform P of the folded textile fabric by rows of stitches 19. In the embodiment described herein, first one row of intermediate electroconductive film strips 21 is stitched into place and then a second row of intermediate electroconductive film strips 21 is stitched into place. It is also contemplated that a double row of electroconductive strips may be stitched into place at the same time, thus connecting both intermediate electroconductive film strips to the coated textile fabric at the same time. In either embodiment disclosed herein, alternative known means for securing other than stitching are contemplated.

In one example of the method as described above, the coated textile fabric will be fed from a continuous main roll together with a separate continuous roll of coated sealing tape. The coated textile fabric and the coated sealing tape will be sewn together simultaneously in a continuous fashion, along both wings of the coated platform. The main coated textile fabric may, for example, be constructed of 420, 315 or multi-denier nylon, or other suitable denier, with a thermoplastic polyurethane coating on at least one side. The size of the main textile fabric roll may be from about 70 inches to about 90 inches in width and about 44 inches in diameter. The separate roll of coated sealing tape may be about 44 inches in diameter. The sewing at the two seams that secure the coated sealing tape to the wings of the coated platform may, for example, be a 90/30 type chainstitch per seam with about 10 to 16 stitches per inch, at a speed of from about 2500 to about 3000 stitches per minute (approximately 200 linear inches per minute). The seam margins for the sealing tape to platform chainstitch, for example, may be about 2 inches per seam. If desired, the top side edges of the stitched and sealed air curtain structure above the wing seams can also be stitched together with a seam margin of about 5/8 inches. The use of material guiding devices, edge sensors, automatic feed roller systems, material monitors and other known automating and controlling devices may be used in the process. The material roll and unwinding system is designed to pull the material from the rolls as needed and as the material monitors require.

Figures 5, 6:
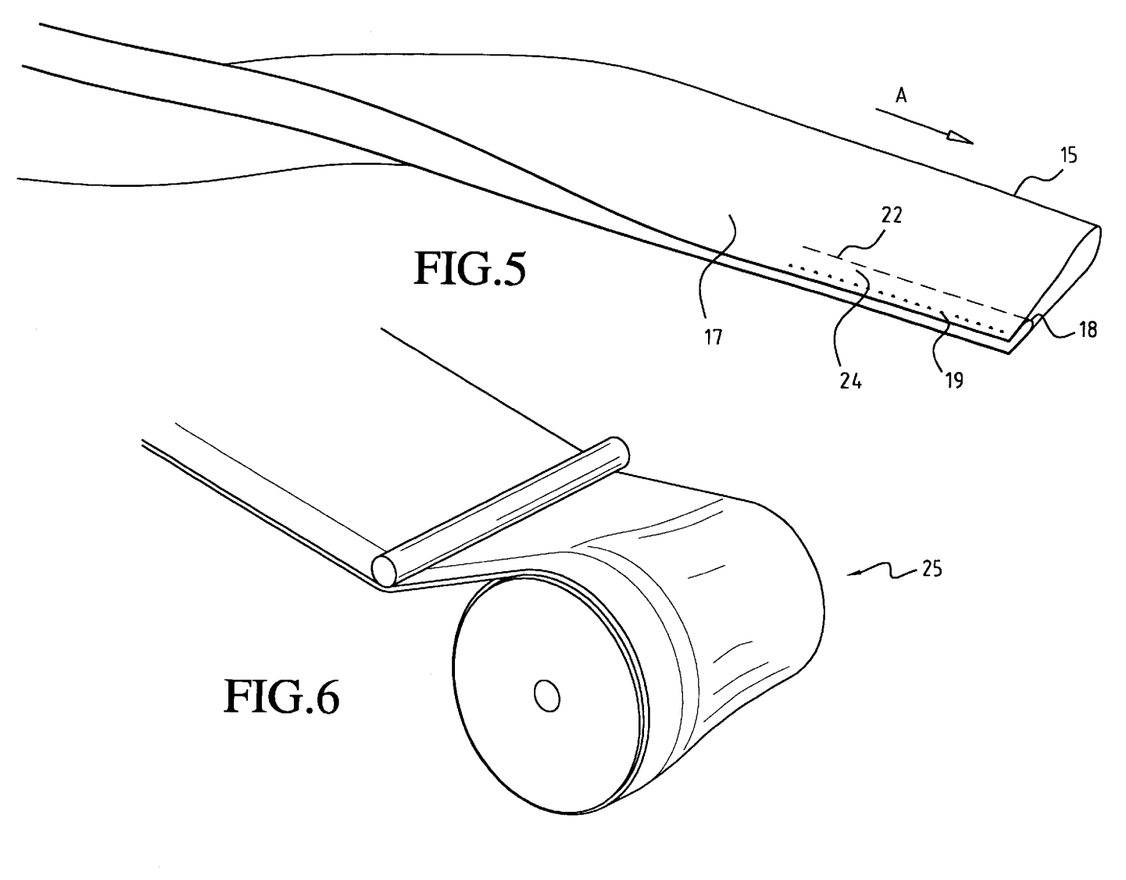
FIG. 5 is a perspective view of the taped and stitched, heat sealed textile fabric of either of the embodiments of FIG. 3c or FIG. 4c.
FIG. 6 is a perspective view of the taped and stitched, heat sealed textile fabric of FIG. 5 being wound into roll form.

In a preferred embodiment, the stitched and taped textile fabric is then pulled flat on its side in direction A, as shown in FIG. 5. In this position, the intermediate electroconductive film 21 and/or polyurethane coated sealing tape 18, not seen in this Fig., is folded and stitched into the textile fabric beneath the stitch line 19. The stitched coated sealing tape 18 extends from a point below the stitch line 19 to about dashed line 22. While being pulled in this position, the textile fabric can be heat sealed along the stitch line 19 by radio frequency (RF) welding, ultrasonic heating techniques or other means of applying heat to the stitch line. Upon heat sealing of the coated textile fabric along the stitch line 19, the polyurethane coating on both the textile fabric and sealing tape 18 melts and flows into the stitch holes, thereby effectively sealing or fusing them and making them airtight. The result is shown in FIG. 3c which shows the sealing tape 18 secured in place along the top of textile fabric 11 by stitches 19 and melted, heat fused polyurethane 20. In this embodiment of the method, the heat sealing is accomplished, preferably by RF welding, which requires that the textile fabric be stopped periodically to apply the heating surfaces to the fabric. Fully continuous heat sealing methods are also contemplated as being useful in this invention. In heat sealing the fabric, a bead sealing process, as disclosed in the aforementioned commonly assigned application Ser. No. 09/452,030 entitled "Heat Sealable Coated Flexible Fabric For Inflatable Vehicle Restraint Systems And Method For Producing Same," filed Nov. 30, 1999, now U.S. Pat. No. 6,350,709 B1, can be employed.

Where the alternative embodiment incorporating the intermediate electroconductive film strips 21 as shown in FIG. 4 is employed, the stitched, coated textile fabric with sealing tape and electroconductive film strip is laid on its side, as shown in FIG. 5, and pulled in direction A through a microwave oven where it is heat sealed. During the microwave heating phase of the process, the intermediate electroconductive strips 21 become hot by microwave action, which causes the polyurethane strips to melt. The heating also causes the polyurethane coatings adjacent thereto in the tape sandwich S (best shown in FIG. 5) to melt and to flow into the stitch holes along the stitch lines 19, thereby sealing the holes. Pressure may be applied to the textile fabric in this phase of the process by the heat sealing means described above or by rollers or other known means to ensure complete sealing of the stitch holes. As a result, the textile fabric, which is already airtight at its bottom folded edge 15 becomes air tight at its sealed, taped, and stitched top portion 24. The textile fabric is then rewound on a drum into a roll 25, as shown in FIG. 6, for storage or shipment before further fabrication into an air bag or side air curtain.

Figures 7, 8:
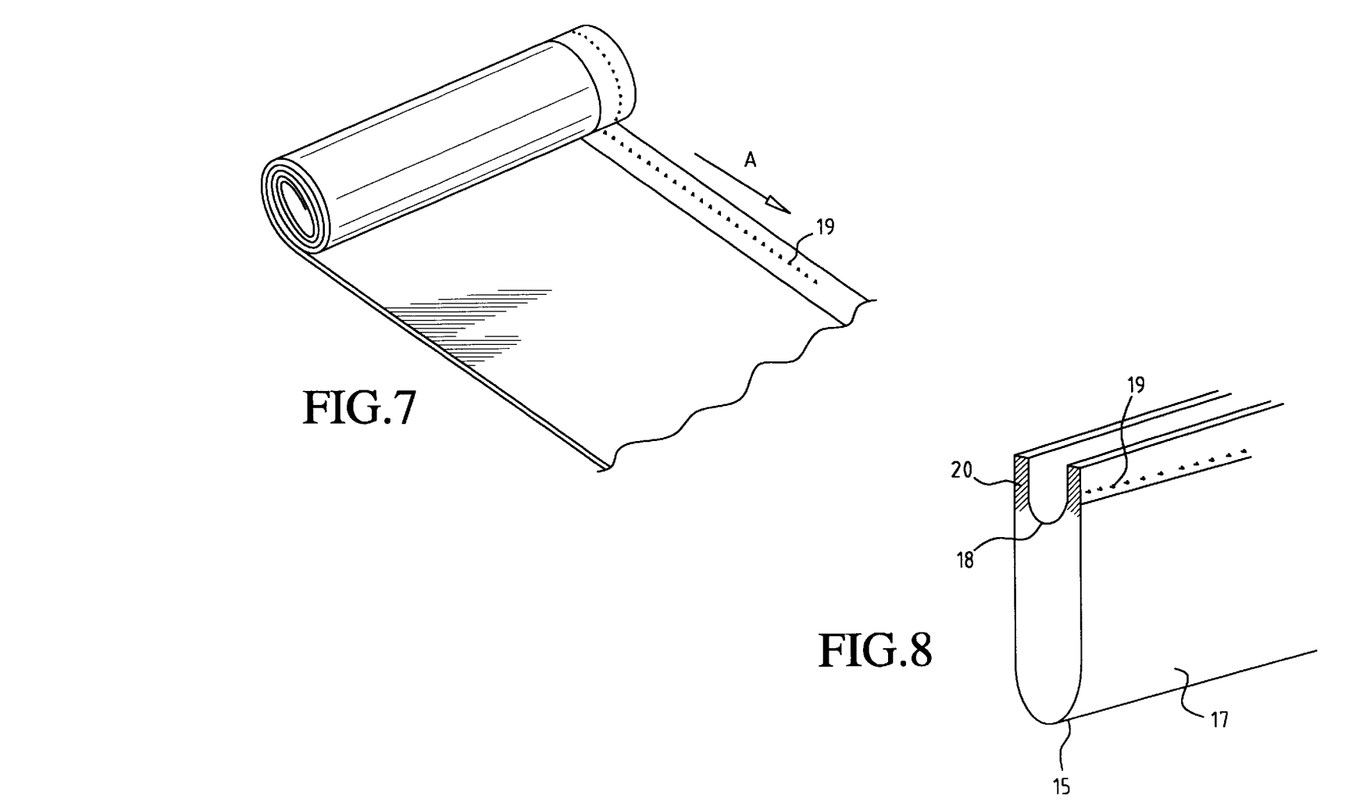
Figure 9:
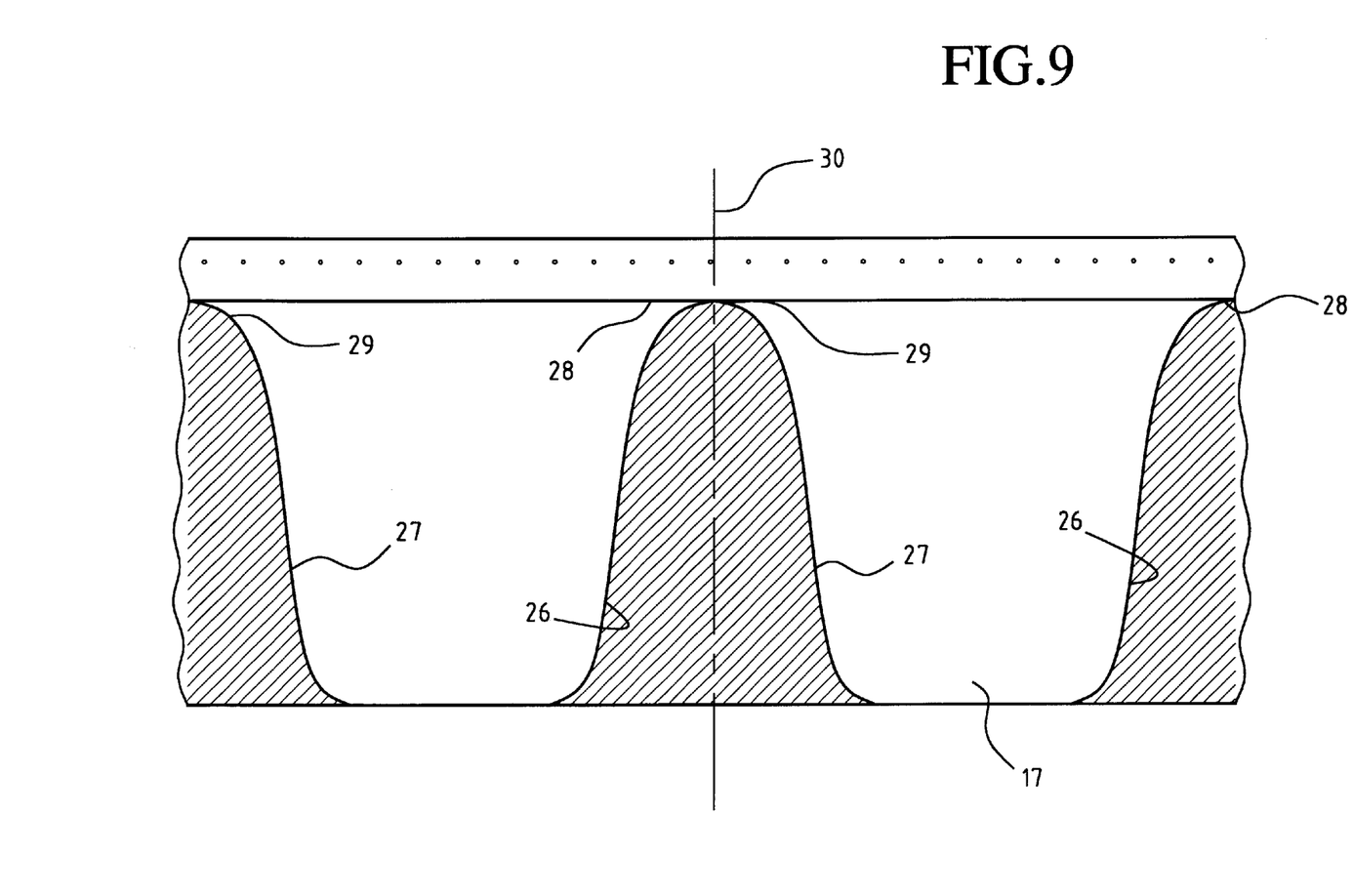
FIG. 9 is a right side elevational view of the taped and stitched, heat sealed textile fabric of FIGS. 7 and 8, illustrating the cutting lines that are used to form a series of automotive vehicle restraint systems, each in the form of a side air curtain, for example.

In the next step of the manufacturing method, the roll 25 of stitched, taped, and heat sealed textile fabric is unrolled, as shown in FIG. 7, and pulled in direction A for further processing. FIG. 8, which is a right side front perspective view from above, of the structure shown in FIG. 7, shows the condition of the coated textile fabric at this stage of production with both the top and bottom of the structure being air tight. As shown in FIG. 8, the top of the textile fabric where sealing tape 18, or in the alternative embodiment, sealing tape 18 and intermediate electroconductive film strips 21 (FIG. 4d)), are secured by stitch line 19, has been heat sealed and is air tight. The bottom fold 15 and sides 17 of the coated textile fabric are also air tight. The textile fabric is ready to be cut at its sides into the desired shape of an air bag or side air curtain. The shaping portion of the process is shown in FIG. 9, in which the top-stitched and heat sealed textile fabric is slit along dashed line 30 to form separate air curtain structures and cut at its sides along lines 26 and 27 into the desired shape of an air curtain. The shaded portions shown in FIG. 9 are discarded and what remains is a shaped air curtain that is open at sides 26 and 27. The open sides 26 and 27 are then stitched and sealed, such as by radio frequency (RF) welding, known as heat sealing, or other known heat sealing techniques along lines 26 and 27 to form a series of side air curtains. Since the interior walls of the air curtain are coated with a thermoplastic polyurethane as described above, the coating will melt upon the application of heat and flow into the stitch holes, thereby sealing them. If desired, an intermediate electroconductive polyurethane film strip can be placed between the side edges of the air curtain as in a sandwich, and then sewn and heat sealed as described above. In the particular embodiment of a design for a side air curtain shown in FIG. 9, the sealing lines 26 and 27 form a complete seal with the sides 17 of the textile fabric at points 28 and 29, thus completely sealing the side air curtain on all sides. The remaining open flaps at the top above the stitch line 19 are not a part of the air tight structure itself, but can be sewn together as shown in FIG. 3d to form a tubular structure for hanging the air curtain for example, from a rod mounted along the roof of an automotive vehicle.

Figures 10, 11:
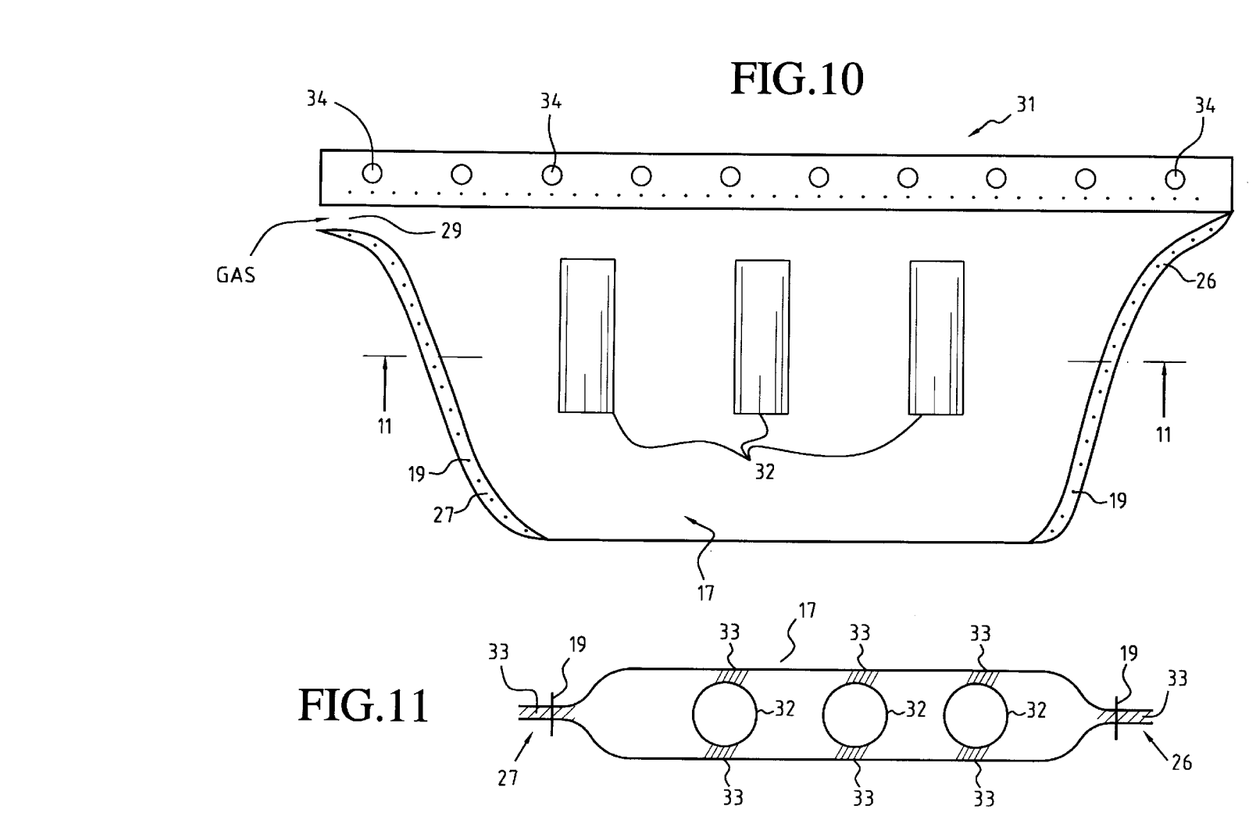
FIG. 10 is a side elevational view of a side air curtain in the form shown in FIG. 9, after stitching and heat sealing of the side end portions, and with the addition of internally positioned tubular tether devices.
FIG. 11 is a cross-sectional view of a side air curtain in the form shown in FIG. 10, taken along lines 11—11, and illustrating the internally positioned tubular tether devices and stitched and heat sealed end portions thereof.

As shown in FIG. 10, an individual side air curtain 31 with stitched and sealed sides 26 and 27 has been cut at point 29 to provide a port for the inflator and related equipment that will be connected before final installation of the side air curtain into a vehicle. In the embodiment of a side air curtain shown in FIG. 10, hollow, shock absorbing tubular tethers 32 have previously been secured into the side air curtain by means of the techniques disclosed in a commonly assigned application Ser. No. 09/459,768, filed Dec. 13, 1999, now abandoned, the disclosure of which is incorporated herein by reference and made a part of this disclosure. If desired, holes 34 can be cut in the top portion of the air curtain above the seal and stitch line 19 as shown in FIG. 10, to provide a means for hanging or supporting the air curtain by hangers along the roof of a vehicle. Since these holes or other means of support are cut above the seal and stitch line, they will not adversely affect the air holding capability of the device. FIG. 11 is a cross-sectional view taken along lines 11—11 of the side air curtain shown in FIG. 10. In FIG. 11 there is shown the stitches 19 and heat seals 33 along the edges 26 and 27 of the sealed side portions of the side air curtain, and tubular tethers 32, secured to the inner sides of the air curtain by heat seals 33.

The air curtain shown in FIG. 10 is ready for further fabrication into an operative air curtain by fitting it with means for gas introduction at port 29. The process itself is made semi-continuous in connection with the formation of the side air curtain itself, by the use of the microwave techniques disclosed herein. Other processing steps are also contemplated as, for example, coating the outer sides 17 of the air curtain with coatings of various kinds, including polyurethane and polysiloxane, or combinations thereof, as disclosed in the commonly assigned applications referred to above. Where a stretchable knit fabric is used as the base textile fabric, the polyurethane coating would be on the inside of the air bag and the outside of the bag could be coated with polyurethane or polysiloxane. Alternatively no coating may be used. In particular, the outer sides of the air curtain could be coated with polysiloxane alone or with adhesive polyurethane on top of which is coated a layer of polysiloxane. Alternatively, the outer sides of the air curtain could be coated with one or more layers of polyurethane. These types of coatings are disclosed in the above-mentioned commonly assigned application Ser. Nos. 327,243, filed Jun. 7, 1999, now U.S. Pat. No. 6,239,046 B1, and 327,244, filed Jun. 7, 1999, abandoned in favor of 09/956,639, filed Sep. 19, 2001. These and other modifications and changes that may be made within the scope of the appended claims are contemplated in connection with the invention.

What is claimed is:

1. An air-holding vehicle restraint system, which comprises:
    a) a textile fabric having a thermoplastic polymeric coating on at least one side thereof, said coated fabric being folded along its lengthwise direction to form a closed bottom end and two open upper ends, with the coated side of the fabric facing inwardly, each of said upper open ends of said textile fabric being turned outwardly to form a coated platform;
    b) a sealing tape positioned upon said coated platform and in contact therewith;
    c) means to secure said sealing tape to said coated platform, said sealing tape being sealed to said coated platform and said coated textile fabric being cut along predetermined side edges; and
    d) means to seal said cut side edges of said coated textile fabric to form an airholding vehicle restraint system of desired shape.

2. The air holding vehicle restraint system according to claim 1 wherein said means to secure said sealing tape to said coated platform comprises sewn stitches and heat sealing.

3. The air holding vehicle restraint system of claim 2 wherein said side edges of said textile fabric are sealed by sewing and heat sealing.

4. The air holding vehicle restraint system of claim 3 wherein said upper open ends of said taped, sealed platform are folded upwardly and secured together to form a tube-shaped structure at the upper end of said air-holding vehicle restraint system.

5. The air holding vehicle restraint system of claim 4 wherein said upper open ends of said taped, sealed platform are secured by sewn stitches.

6. The air holding vehicle restraint system of claim 5 wherein said textile fabric is comprised of synthetic fibers.

7. The air holding vehicle restraint system of claim 5 wherein said textile fabric is a knitted, woven, or non-woven fabric.

8. The air holding vehicle restraint system of claim 6 wherein said synthetic fibers are selected from the group consisting of polyamides and polyesters.

9. The air holding vehicle restraint system of claim 6 wherein said textile fabric is woven nylon.

10. The air holding vehicle restraint system of claim 9 wherein said coating of thermoplastic polymeric material on said at least one side of said textile fabric comprises a first adhesive coating layer selected from the group consisting of aromatic and aliphatic polyester or polyether polyurethanes and a second elastomeric coating layer which comprises an elastomeric polyether or polyester polyurethane.

11. The air holding vehicle restraint system of claim 10 wherein said sealing tape comprises a textile fabric coated on at least one side with a polymeric material.

12. The air holding vehicle restraint system of claim 11 wherein said textile fabric of said sealing tape is comprised of synthetic fibers and is knitted, woven or non-woven.

13. The air holding vehicle restraint system of claim 12 wherein said polymeric material coating on said sealing tape is polyurethane.

14. The air holding vehicle restraint system of claim 12 wherein said textile fabric of said sealing tape is woven nylon.

15. The air holding vehicle restraint system of claim 13 wherein said synthetic fibers of said sealing tape are selected from the group consisting of polyamides and polyesters.

16. The air holding restraint system of claim 14 wherein said sealing tape is laid upon said coated platform with its thermoplastic polyurethane coating in face-to-face contacting relationship with said polyurethane coated platform.

17. The air holding vehicle restraint system of claim 16 wherein said adhesive coating layer, on said at least one side of said textile fabric has a coating weight of from about 0.3 ounces/sq. yd. to about 1.5 ounces/sq. yd. and said second coating layer has a solids content of from about 30% to about 100% by weight.

18. The air holding vehicle restraint system of claim 17 wherein said second coating layer, on said at least one side of said textile fabric has a coating weight of from about 1 ounce/sq.yd. to about 8 ounces/sq.yd.

19. The air holding vehicle restraint system according to claim 18 wherein said textile fabric is coated on a second side with a polymeric material.

20. The air holding vehicle restraint system according to claim 19 wherein said coating of polymeric material on said second side of said textile material comprises a coating layer of polysiloxane.

21. The air holding vehicle restraint system of claim 1 wherein said coating of thermoplastic polymeric material on said at least one side of said textile fabric comprises a first adhesive coating layer selected from the group consisting of aromatic or aliphatic polyester or polyether polyurethanes and a second elastomeric coating layer consisting of an elastomeric polyether or polyester polyurethane.

22. The air holding restraint system of claim 21 wherein said adhesive coating layer has a coating weight of from 0.3 ounces/sq. yd. to about 1.5 ounces/sq.yd. and said second coating layer has a solids content of from about 30% to about 100% by weight.

23. The air holding restraint system of claim 22 wherein said second coating layer has a coating weight of from about 1 ounce/sq. yd. to about 8 ounces/sq. yd.

24. The air holding restraint system of claim 22 wherein said intermediate unsupported electroconductive strip is a polyurethane film.

25. The air holding restraint system of claim 23 wherein said unsupported electroconductive strip is sewn between said coated platform and said coated sealing tape.

26. The air holding restraint system of claim 25 wherein said unsupported electroconductive strip is a film strip having electroconductive material therein.

27. The air holding restraint system of claim 24 wherein said heat sealing is effected by radio frequency sealing, hot air sealing or ultrasonic sealing.

28. The air holding restraint system of claim 27 wherein said heat sealing is effected by radio frequency sealing at a frequency of from about 10 to about 80 megahertz.

29. The air holding restraint system of claim 1 wherein an additional intermediate layer is positioned between said coated platform and said coated sealing tape, said intermediate layer comprising an electroconductive strip.

30. The air holding restraint system of claim 29 wherein said intermediate electroconductive strip comprises an unsupported film strip.

31. The air holding restraint system of claim 30 wherein said electroconductive material is selected from the group consisting of powdered metal, carbon black, stainless steel and aluminum and is in the form of particles interspersed therethrough.

32. An air-holding vehicle restraint system, which comprises:
   a) a textile fabric having a thermoplastic polymeric coating, said coated fabric being folded along its lengthwise direction to form a closed bottom end and two open upper ends, with the coated side of the fabric facing inwardly, each of said upper open ends of said textile fabric being turned outwardly to form a coated platform;
   b) a sealing tape positioned upon said coated platform and in contact therewith;
   c) sewn stitches to secure said sealing tape to said coated platform, said sealing tape being heat sealed to said coated platform, and said coated textile fabric being cut along predetermined side edges; and
   d) heat formed seals to seal said cut side edges of said coated textile fabric to form an air-holding vehicle restraint system of desired shape.

33. The air-holding vehicle restraint system of claim 32 wherein said heat formed seals on said side edges are formed by radio frequency heat sealing.

34. The air-holding vehicle restraint system of claim 33 (wherein said heat formed seals on said side edges are formed by radio frequency sealing at a frequency of from about 10 to about 80 megahertz.

35. An air-holding vehicle restraint system, which comprises:
   a) a textile fabric having a thermoplastic polymeric coating, said coated fabric being folded along its lengthwise direction to form a closed bottom end and two open upper ends, with the coated side of the fabric facing inwardly, each of said upper open ends of said textile fabric being turned outwardly to form a coated platform;
   b) a sealing tape positioned upon said coated platform and in contact therewith;
   c) an intermediate electroconductive strip positioned between said coated platform and said sealing tape, said intermediate strip having electroconductive material therein;
   d) sewn stitches to secure said sealing tape and said intermediate conductive strip to said coated platform, said sealing tape being heat sealed to said coated platform, and said coated textile fabric being cut along predetermined side edges; and
   e) heat formed seals to seal said cut side edges of said coated textile fabric to form an air-holding vehicle restraint system of desired shape.

36. The air holding vehicle restraint system of claim 35 wherein said electroconductive material is selected from the group consisting of powdered metal, carbon black, stainless steel and aluminum, and is in the form of particles interspersed therethrough.

* * * * *